US008641901B2

(12) United States Patent
Reid et al.

(10) Patent No.: US 8,641,901 B2
(45) Date of Patent: Feb. 4, 2014

(54) FILTER STRUCTURE

(75) Inventors: Jason W. Reid, Gastonia, NC (US); Jason LaMarr Tate, Bessemer City, NC (US)

(73) Assignee: Wix Filtration Corp LLC, Gastonia, NC (US)

(*) Notice: Subject to any disclaimer, the term of this patent is extended or adjusted under 35 U.S.C. 154(b) by 0 days.

(21) Appl. No.: 13/477,804

(22) Filed: May 22, 2012

(65) Prior Publication Data

US 2012/0228210 A1     Sep. 13, 2012

Related U.S. Application Data

(63) Continuation of application No. 12/416,717, filed on Apr. 1, 2009, now Pat. No. 8,192,623.

(51) Int. Cl.
*B01D 29/56* (2006.01)
*B01D 29/01* (2006.01)
*B01D 29/05* (2006.01)
*B01D 29/07* (2006.01)
*B01D 29/23* (2006.01)
*B01D 46/00* (2006.01)
*B01D 46/52* (2006.01)

(52) U.S. Cl.
CPC .............. *B01D 29/012* (2013.01); *B01D 29/05* (2013.01); *B01D 29/073* (2013.01); *B01D 29/237* (2013.01); *B01D 29/56* (2013.01); *B01D 46/0023* (2013.01); *B01D 46/527* (2013.01); *B01D 2201/12* (2013.01); *B01D 2201/31* (2013.01)

USPC ..... 210/335; 210/489; 210/493.4; 210/497.1; 55/487; 55/488; 55/490; 55/498; 55/521

(58) Field of Classification Search
USPC .............. 210/335, 339, 446, 455, 489, 493.4, 210/497.1; 55/486, 487, 488, 490, 498, 521
See application file for complete search history.

(56) References Cited

U.S. PATENT DOCUMENTS

| 2,582,388 | A | * | 1/1952 | Mansfield | 210/335 |
| 3,386,580 | A | * | 6/1968 | Grabarczyk | 210/335 |
| 4,689,145 | A | * | 8/1987 | Mathews et al. | 210/339 |
| 5,690,825 | A | * | 11/1997 | Parton | 210/489 |
| 5,820,646 | A | | 10/1998 | Gillingham et al. | |

(Continued)

OTHER PUBLICATIONS

Restriction Requirement dated Jun. 14, 2011, relating to U.S. Appl. No. 12/416,717.

(Continued)

*Primary Examiner* — Christopher Upton
(74) *Attorney, Agent, or Firm* — Honigman Miller Schwartz and Cohn LLP

(57) ABSTRACT

A filter element is disclosed. The filter element includes a filter casing defining an inner radial surface, a filter body disposed within the casing, the filter body having an axial, dirty side surface and an axial, clean side surface, wherein the filter body includes fluted filter media having one or more flutes that extend from the dirty side surface to the clean side surface and a pre-filter including an axial, dirty side surface and an axial, clean side surface, the pre-filter arranged within the casing so that the dirty side surface of the pre-filter is proximate the clean side surface of the filter body, wherein the filter body and the pre-filter are fixably retained by the inner radial surface of the casing.

12 Claims, 6 Drawing Sheets

(56) References Cited

U.S. PATENT DOCUMENTS

| | | |
|---|---|---|
| D417,268 S | 11/1999 | Gillingham |
| 6,179,890 B1 | 1/2001 | Ramos et al. |
| D437,402 S | 2/2001 | Gieseke et al. |
| 6,190,432 B1 | 2/2001 | Gieseke et al. |
| 6,235,195 B1 | 5/2001 | Tokar |
| 6,348,085 B1 | 2/2002 | Tokar et al. |
| 6,350,291 B1 | 2/2002 | Gieseke et al. |
| 6,416,605 B1 | 7/2002 | Golden |
| D466,602 S | 12/2002 | Gieseke et al. |
| 6,517,598 B2 | 2/2003 | Anderson et al. |
| 6,533,845 B2 | 3/2003 | Tokar et al. |
| 6,554,139 B1 | 4/2003 | Maxwell et al. |
| 6,610,117 B2 | 8/2003 | Gieseke et al. |
| 6,610,126 B2 | 8/2003 | Xu et al. |
| D483,459 S | 12/2003 | DeWit et al. |
| 6,746,518 B2 | 6/2004 | Gieseke et al. |
| 6,783,565 B2 | 8/2004 | Gieseke et al. |
| 6,797,168 B1 | 9/2004 | Knight |
| D497,202 S | 10/2004 | Carter et al. |
| 6,878,190 B1 | 4/2005 | Xu et al. |
| 6,960,245 B2 | 11/2005 | Tokar et al. |
| 6,966,940 B2 | 11/2005 | Krisko et al. |
| 6,986,426 B2 | 1/2006 | Clausen et al. |
| 6,994,744 B2 | 2/2006 | Tokar et al. |
| 6,997,968 B2 | 2/2006 | Xu et al. |
| 7,086,537 B2 | 8/2006 | Maxwell et al. |
| 7,140,560 B2 | 11/2006 | Stotts et al. |
| 7,147,110 B2 | 12/2006 | Clausen et al. |
| 7,252,704 B2 | 8/2007 | Tokar et al. |
| 7,303,604 B2 | 12/2007 | Gieseke et al. |
| 7,393,375 B2 | 7/2008 | Xu et al. |
| 7,396,375 B2 | 7/2008 | Nepsund et al. |
| 7,396,376 B2 | 7/2008 | Schrage et al. |
| 8,192,623 B2 * | 6/2012 | Reid et al. ............... 210/335 |
| 2001/0003893 A1 | 6/2001 | Ramos et al. |
| 2003/0205140 A1 * | 11/2003 | Flaugher et al. ............ 210/446 |
| 2007/0039296 A1 | 2/2007 | Schrage et al. |
| 2007/0175194 A1 | 8/2007 | Nepsund et al. |
| 2007/0261374 A1 | 11/2007 | Nelson et al. |
| 2007/0289265 A1 | 12/2007 | Coulonvaux et al. |
| 2008/0016832 A1 | 1/2008 | Krisko et al. |
| 2008/0066434 A1 | 3/2008 | Kuempel et al. |
| 2008/0086990 A1 | 4/2008 | Kuempel et al. |
| 2008/0110142 A1 | 5/2008 | Nelson et al. |
| 2008/0115470 A1 | 5/2008 | Kuempel et al. |
| 2008/0115758 A1 | 5/2008 | Engelland et al. |
| 2008/0209874 A1 | 9/2008 | Gieseke et al. |
| 2008/0216654 A1 | 9/2008 | Wagner et al. |
| 2008/0250766 A1 | 10/2008 | Schrage et al. |
| 2008/0264008 A1 | 10/2008 | Xu et al. |
| 2008/0264020 A1 | 10/2008 | Schrage et al. |
| 2008/0271423 A1 | 11/2008 | Nepsund et al. |
| 2008/0276582 A1 | 11/2008 | Boehrs et al. |

OTHER PUBLICATIONS

Non-Final Office Action dated Aug. 25, 2011, relating to U.S. Appl. No. 12/416,717.

* cited by examiner

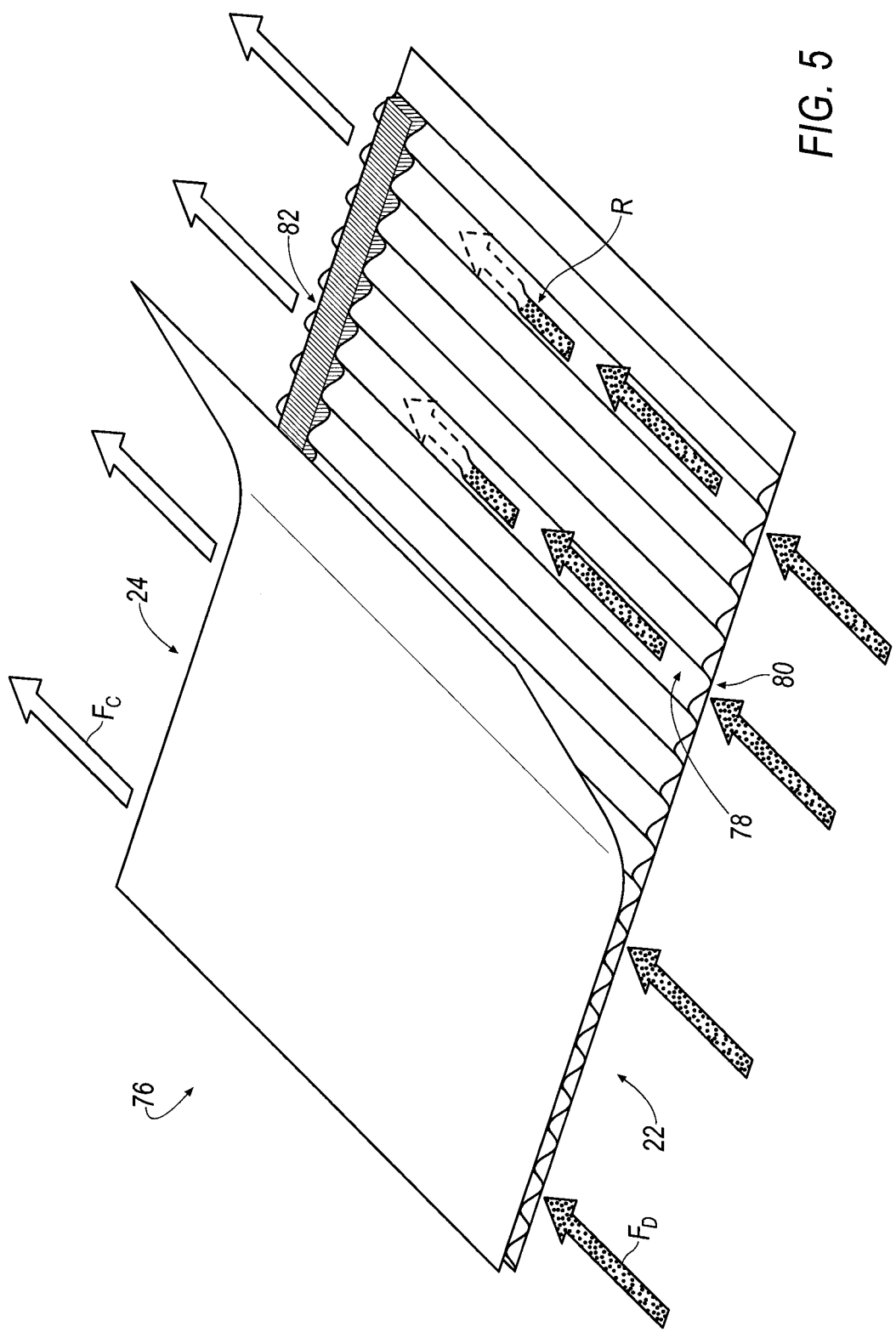

FILTER STRUCTURE

CROSS REFERENCE TO RELATED APPLICATION

This application is a Continuation of application Ser. No. 12/416,717 filed on Apr. 1, 2009, which is entirely incorporated herein by reference.

FIELD

The invention relates to filters.

BACKGROUND

Various filters are known in the art for filtering fluid as it passes through a fluid path. Filters include, in part, filter media which removes impurities from a fluid, such as, for example, air, oil or fuel that passes through filter media.

While known filters have proven to be acceptable for various applications, such conventional filters are nevertheless susceptible to improvements that may enhance their overall performance and cost. Therefore, a need exists to develop improved filters that advance the art.

SUMMARY

A filter element is disclosed. The filter element includes a filter casing defining an inner radial surface, a filter body disposed within the casing, the filter body having an axial, dirty side surface and an axial, clean side surface, wherein the filter body includes fluted filter media having one or more flutes that extend from the dirty side surface to the clean side surface and a pre-filter including an axial, dirty side surface and an axial, clean side surface, the pre-filter arranged within the casing so that the dirty side surface of the pre-filter is proximate the clean side surface of the filter body, wherein the filter body and the pre-filter are fixably retained by the inner radial surface of the casing.

BRIEF DESCRIPTION OF THE DRAWINGS

The present disclosure will now be described, by way of example, with reference to the accompanying drawings, in which:

FIG. 5 is a perspective view of a layer of filter media of the filter structure in accordance with an exemplary embodiment of the invention.

DETAILED DESCRIPTION

The Figures illustrate exemplary embodiments of a filter structure in accordance with embodiments of the invention and based on the foregoing, it is to be generally understood that the nomenclature used herein is simply for convenience and the terms used to describe the invention should be given the broadest meaning by one of ordinary skill in the art.

Figure 1:
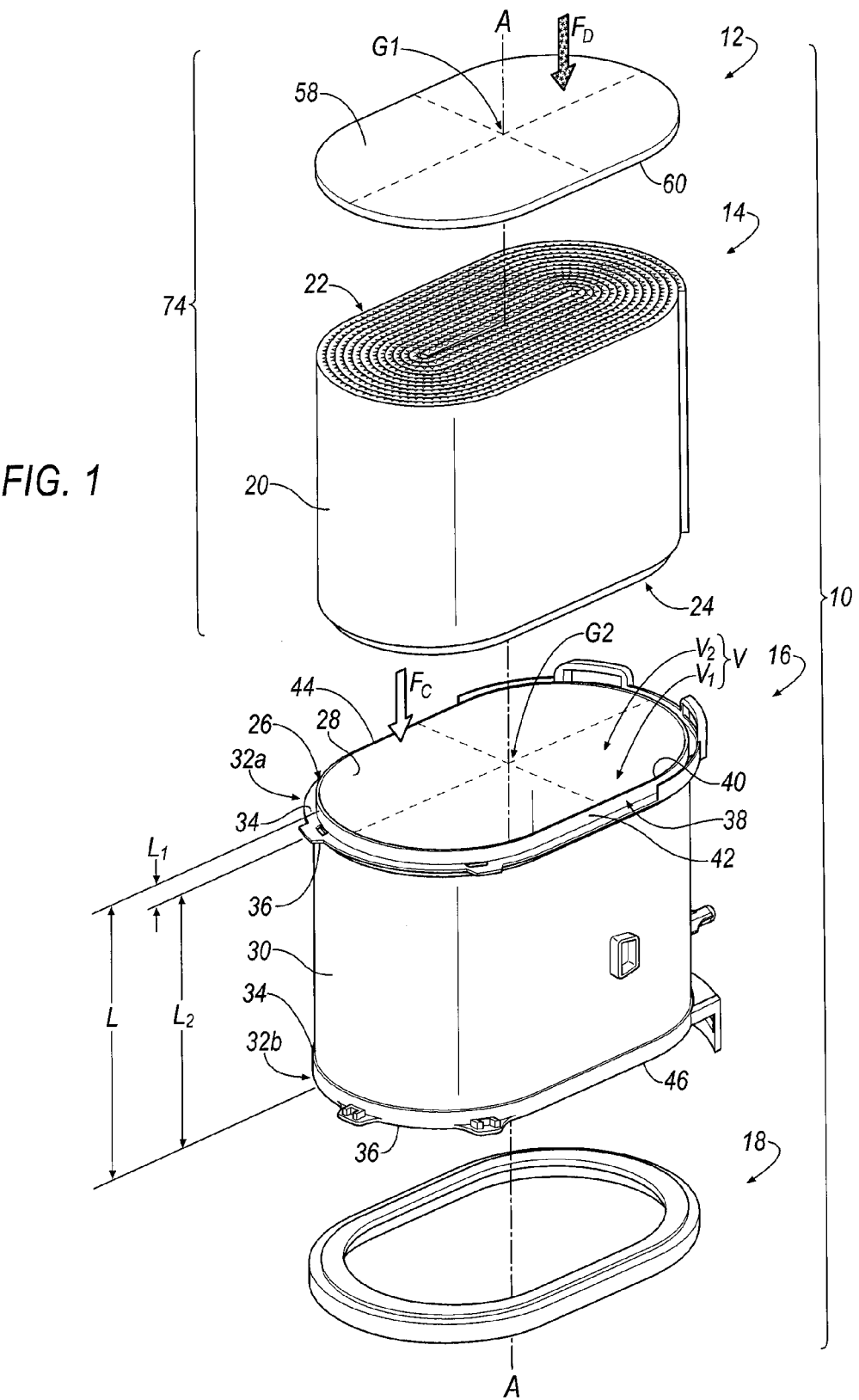
FIG. 1 is an exploded, perspective view of a filter structure in accordance with an exemplary embodiment of the invention.
Figure 2:
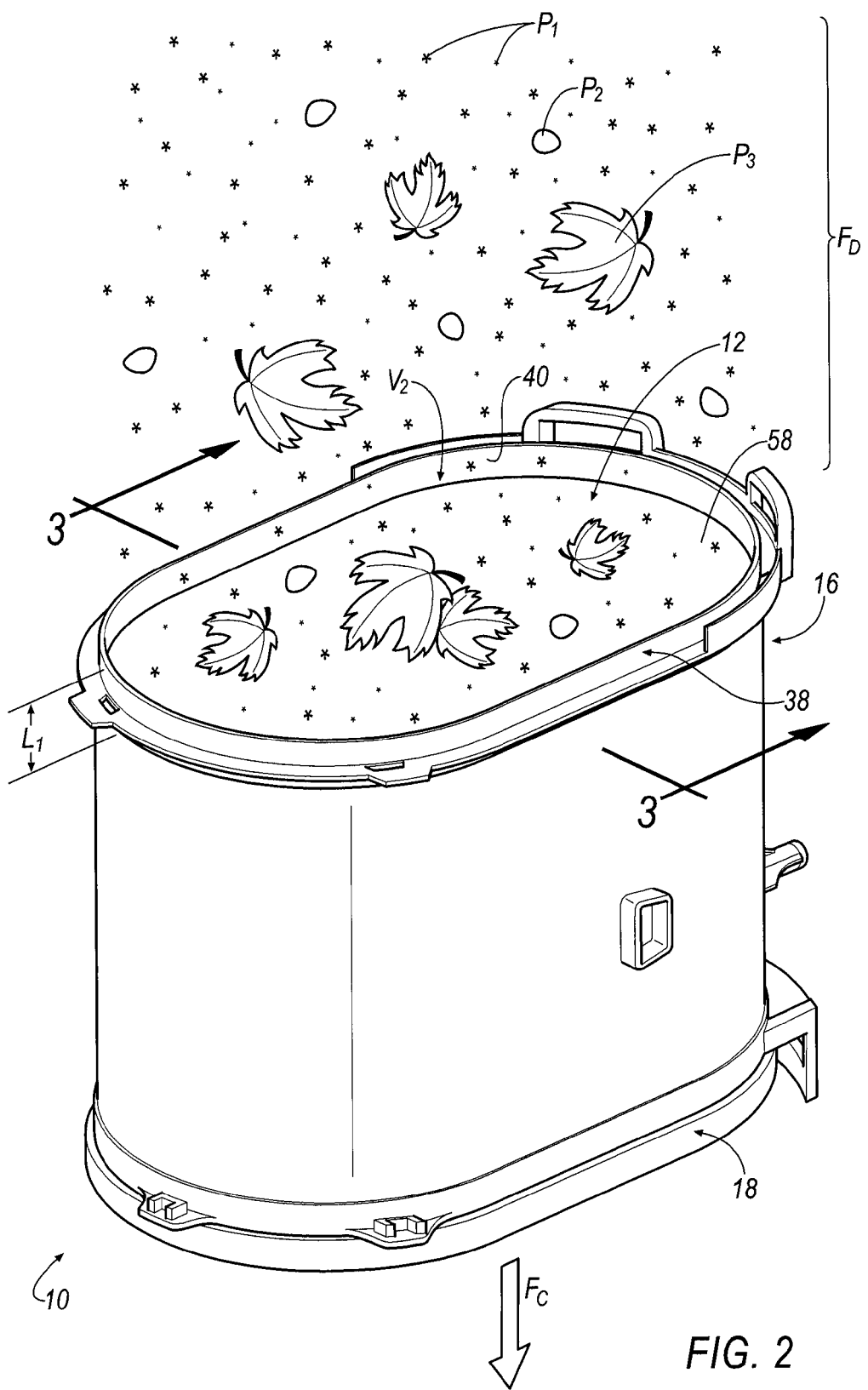
FIG. 2 is an assembled, perspective view of the filter structure of FIG. 1 in accordance with an exemplary embodiment of the invention.
Figure 3:
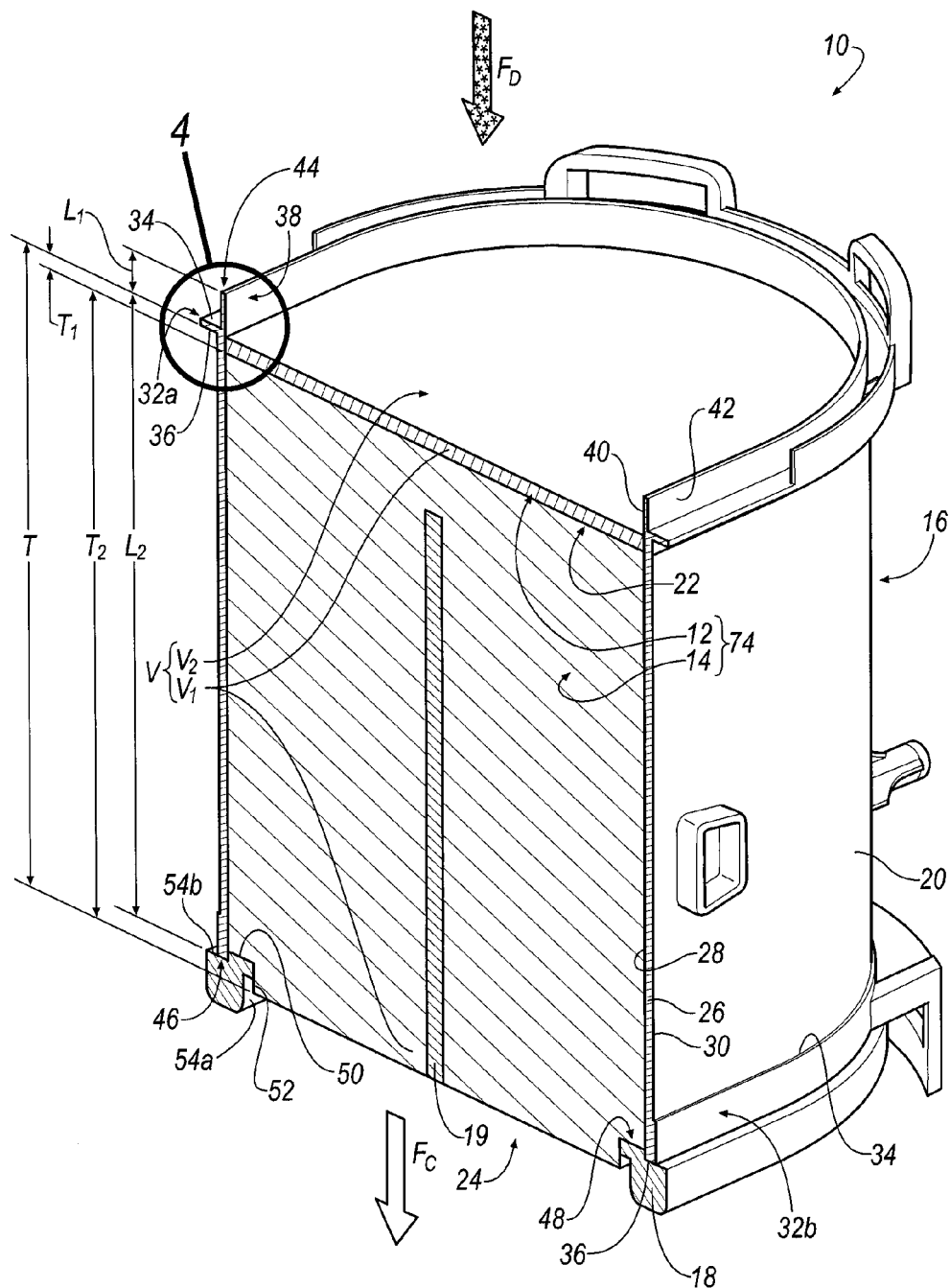
FIG. 3 is a perspective, cross-sectional view of the filter structure of FIG. 2 according to line 3-3 in accordance with an exemplary embodiment of the invention.

Referring to FIGS. 1-3, a filter structure is shown generally at 10 in accordance with an exemplary embodiment of the invention. In an embodiment, the filter structure 10 includes a pre-filter 12, a filter body 14, a casing 16 and a seal 18. In an embodiment, the filter structure 10 may include a core 19.

Referring to FIG. 1, an axis, A-A, generally extends through the filter structure 10. In an embodiment, the filter body 14 includes an outer side surface 20, that may be bound by a first axial end surface 22 and a second axial end surface 24.

In an embodiment, the filter body 14 is designed to receive a dirty fluid, such as, for example, air, according to the direction of the arrow, $F_D$. As illustrated, the dirty fluid, $F_D$, enters the filter body 14 at the pre-filter 12 and the first axial end surface 22 of the filter body 14; as such, the first axial end surface 22 may be referred to as the "dirty side flow face" of the filter body 14.

In an embodiment, when dirty fluid, $F_D$, passes through the filter body 14, any impurities that are contained in the dirty fluid, $F_D$, are removed therefrom such that the dirty fluid, $F_D$, is thereafter referred to as clean fluid, that is directed away from the filter body 14 according to the direction of the arrow, $F_C$. In an embodiment, the clean fluid, $F_C$, exits the filter body 14 from the second axial end surface 24. As such, the second axial end surface 24 may be referred to as the "clean side flow face."

It will be appreciated that reference to a "dirty side" and a "clean side" in the forgoing disclosure is meant for descriptive purposes only. Reference to a "dirty side" or "clean side" in the foregoing description provides a frame of reference for other components of the filter structure 10 that establishes a relationship to the above-described surfaces 22, 24 of the filter body 14. Accordingly, the foregoing use of the terms "dirty side" and "clean side" should not be utilized to limit the scope of the recited invention and that a substantially similar utilization of terminology relating to a first surface/second surface or upper surface/lower surface may be used interchangeably with a "dirty side" and a "clean side."

In an embodiment, the casing 16 may include a sidewall 26. The sidewall 26 includes an inner surface 28 and an outer surface 30.

In an embodiment, the casing 16 may include one or more upper lips 32a and one or more lower lips 32b that extend radially outwardly and away from the outer surface 30 of the sidewall 26. In an embodiment, each lip 32a, 32b includes a dirty side surface 34 and a clean side surface 36.

In an embodiment, a collar 38 extends axially away from the dirty side surface 34 of the one or more upper lips 32a. In an embodiment, the collar 38 includes an inner surface 40 and an outer surface 42.

In an embodiment, the casing 16 further includes a dirty side axial end surface 44 and a clean side axial end surface 46. In an embodiment, the dirty side axial end surface 44 of the casing 16 includes the collar 38. In an embodiment, the clean side axial end surface 46 of the casing 16 includes one or more of the lower lips 32b and sidewall 26.

In an embodiment, the casing 16 is defined by a length, L, that extends from the dirty side axial end surface 44 to the clean side axial end surface 46. In an embodiment, the length, L, includes a first sub-length, $L_1$, and a second sub-length, $L_2$.

In an embodiment, the first sub-length, $L_1$, extends from about the dirty side axial end surface 44 to the clean side surface 36 of the one or more upper lips 32s. In an embodiment, the second sub-length, $L_2$, extends from about the clean side surface 36 of the one or more upper lips 32a to the clean side axial end surface 46 of the casing 16. The relationship of the first sub-length, $L_1$, and the second sub-length, $L_2$, to the remaining elements of the filter structure 10 is described in greater detail in the foregoing disclosure.

In an embodiment, the collar 38 is aligned with the sidewall 26. In an embodiment, the sidewall 26 and collar 38 define a volume, V, including a first sub-volume, $V_1$, and a second sub-volume, $V_2$. In an embodiment, the first sub-volume, $V_1$, functions by receiving the pre-filter 12 and filter body 14. In an embodiment, function of the second sub-volume, $V_2$, is described in greater detail herein.

In an embodiment, the casing 16 is an integral component, comprising a substantially rigid material. In an embodiment, the material used with the casing 16 may include, for example, nylon, polypropylene or the like.

In an embodiment, the filter body 14 is disposed within the first sub-volume, $V_1$, of the casing 16 such that the outer side surface 20 of the filter body 14 is disposed substantially adjacent the inner side surface 28 of the casing 16. Referring to FIG. 3, once the filter body 14 is disposed within the first sub-volume, $V_1$, of the casing 16, the seal 18 is formed/disposed over a portion 48 of the clean side flow face 24 of the filter body 14 and the clean side axial end surface 46 of the casing 16.

In an embodiment, the seal 18 may comprise a substantially flexible, non-rigid material. In an embodiment, the material defining the seal 18 may include, for example, polyurethane.

In an embodiment, the portion 48 of the clean side flow face 24 of the filter body 14 includes a stepped ledge defined by an axial ledge surface 50 and a radial ledge surface 52. In an embodiment, the seal 18 substantially covers all of the axial ledge surface 50 and at least partially covers the radial ledge surface 52.

In an embodiment, the clean side flow face 24 of the filter body 14 extends axially past the clean side axial end surface 46 of the casing 16. In an embodiment, an axial portion 54a of the seal 18 extends axially past the clean side flow face 24 of the filter body 14. In an embodiment, a radial portion 54b of the seal 18 extends radially past the outer surface 30 of the casing 16. It will be appreciated, however, that the filter body 14 and seal 18 may include any desirable dimension relative the casing 16 and is not limited to the embodiment shown and described in the present disclosure.

Referring to FIGS. 4A-4D, in an embodiment, once the filter body 14 is disposed within the first sub-volume, $V_1$, of the casing 16, the pre-filter 12 may be disposed within the first sub-volume, $V_1$, of the casing 16, proximate the collar 38, and substantially adjacent one or more of the inner surface 28 of the sidewall 26 and the dirty side flow face 22 of the filter body 14. In an embodiment, once the pre-filter 12 is disposed and recessed into the first sub-volume, $V_1$, the pre-filter 12 is positioned into the first sub-volume, $V_1$, at a distance away from the dirty side axial end surface 44 approximately equal to the first sub-length, $L_1$, of the casing 16.

In an embodiment, the pre-filter 12 defines a substantially annular shape having an outer circumferential surface 56, a dirty side surface 58 and a clean side surface 60. In an embodiment, the pre-filter 12 defines a substantially porous foam material, such as, for example, polyurethane ester. It will be appreciated, however, that the pre-filter 12 may include materials other than foam, such as, for example, a non-woven fabric, a wire mesh, a plastic mesh, or the like.

Figure 4A:
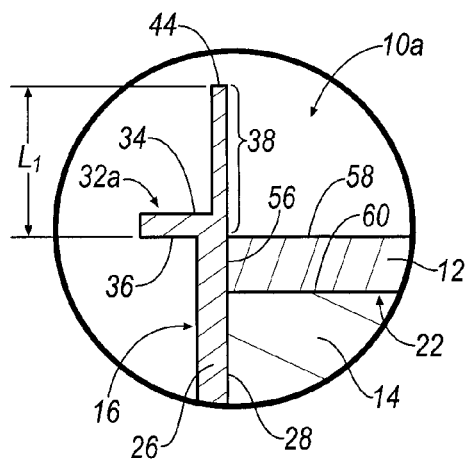
FIGS. 4A-4G each illustrate an enlarged, cross-sectional view of the filter structure of FIG. 3 according to line 4 in accordance with an exemplary embodiment of the invention.

As seen in FIG. 4A, a filter structure is shown generally at 10a in accordance with an embodiment of the invention. In an embodiment, the clean side surface 60 of the pre-filter 12 is disposed substantially adjacent the dirty side flow face 22 of the filter body 14, and, the outer side surface 56 is disposed substantially adjacent the inner surface 28 of the casing 16. In an embodiment, an adhesive may be applied to one or more surfaces 56, 60 or 22, 28 in order to attach the pre-filter 12 to one or more of the filter body 14 and casing 16.

For example, in an embodiment, an adhesive may be applied to the dirty side flow face 22 of the filter body 14 such that upon disposing the pre-filter 12 adjacent the filter body 14, the clean side surface 60 of pre-filter 12 is axially adhered to the filter body 14. Alternatively, in an embodiment, an adhesive may be applied to the clean side surface 60 of the pre-filter 12 such that upon disposing the pre-filter 12 adjacent the filter body 14, the clean side surface 60 of pre-filter 12 is axially adhered to the filter body 14.

Further, for example, in an embodiment, an adhesive may be applied adjacent to the inner surface 28 of the casing 16 such that the outer circumferential surface 56 of the pre-filter 12 is radially adhered to the casing 16. Alternatively, in an embodiment, an adhesive may be applied to the outer circumferential surface 56 of the pre-filter 12 such that the outer circumferential surface 56 of the pre-filter 12 is radially adhered to the casing 16.

It will be appreciated that by providing the adhesive in connecting the pre-filter 12 to one or more of the filter body 14 and casing 16, axial movement of the pre-filter 12 relative the casing 16 is prevented. However, although the pre-filter 12 may be attached to one or more of the filter body 14 and the casing 16 by an adhesive, it will be appreciated that the invention is not limited to an adhesive attachment of the pre-filter 12 to one or more of the filter body 14 and the casing 16. For example, a filter structure is shown generally at 10b that may not, in an embodiment, include adhesive.

In an embodiment, with reference to FIG. 1, the pre-filter 12 of the filter structure 10b may define a first radial cross-sectional geometry, which is shown generally at G1. Further, in an embodiment, a portion of the casing 16 that is proximate, for example, the collar 38 may define a second radial cross-sectional geometry, which is shown generally at G2.

In an embodiment, the first radial cross-sectional geometry, G1 may be substantially similar to the second radial cross-sectional geometry, G2. However, if, for example, the first radial cross-sectional geometry, G1, is proportionally the same as, but, slightly greater than the second radial cross-sectional geometry, G2, the pre-filter 12 may be retained adjacent the casing 16 in a friction-fit connection, FF (see, e.g., FIG. 4B), such that the outer circumferential surface 56 of the pre-filter 12 is forced into and presses against the inner surface 28 of the casing 16. By providing the friction-fit connection, FF, axial movement of the pre-filter 12 relative the casing 16 may be prevented.

Accordingly, if a friction-fit connection, FF, is provided, the pre-filter 12 may not be disposed substantially adjacent the dirty side flow face 22 of the filter body 14, and, appear to buckle/bubble, B, axially away from the dirty side flow face 22 of the filter body 14 at a location substantially near or proximate the inner surface 28 of the casing 16. It will be appreciated, however, that any buckling/bubbling, B, may be obviated by sizing the first radial cross-sectional geometry, G1, to be greater than, but approximately equal to the second radial cross-sectional geometry, G2, of the casing 16. Further, it will be appreciated that the friction-fit connection, FF, may be enhanced, modified or supported by the application of the adhesive to one or more of the surfaces 56, 60 or 22, 28 as described above in a previous embodiment.

Figure 4B:
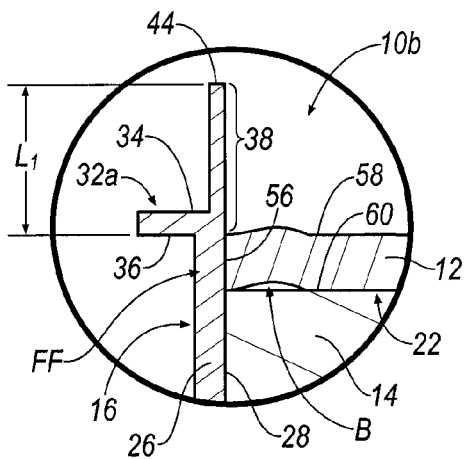
Figure 4C:
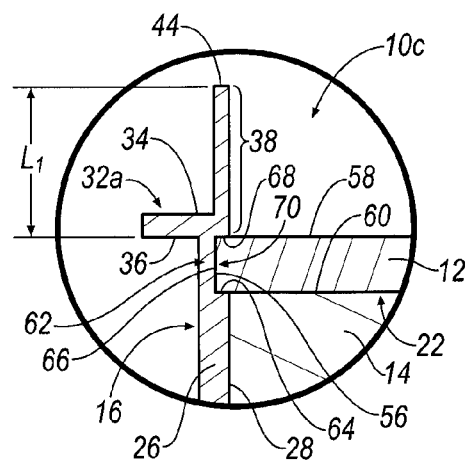

Referring now to FIG. 4C, another embodiment of a filter structure is shown generally at 10c in accordance with an embodiment of the invention. In an embodiment, the first radial cross-sectional geometry, G1, of the pre-filter 12 is proportionally the same as, but, slightly greater than the second radial cross-sectional geometry, G2, of a portion of the casing 16 as similarly described above. However, it will be appreciated that the inner side surface 28 of the casing 16 may be defined by a radial recess 62 defined by an axial, lower ledge surface 64, a radial side surface 66 and an axial, upper ledge surface 68.

As shown in FIG. 4C, a circumferential portion 70 of the pre-filter 12 is nested within the radial recess 62. As illustrated, the circumferential portion 70 includes a portion of the clean side surface 60 of the pre-filter 12 disposed adjacent the axial, lower ledge surface 64, the outer circumferential surface 56 disposed adjacent the radial side surface 66, and a portion of the dirty side surface 58 disposed adjacent the upper ledge surface 68. By disposing the circumferential portion 70 of the pre-filter 12 within the radial recess 62, axial movement of the pre-filter 12 relative the casing 16 may be prevented.

Accordingly, although filter structure 10c includes the pre-filter 12 having the first radial cross-sectional geometry, G1, that is proportionally the same as, but, slightly greater than the second radial cross-sectional geometry, G2, of the casing 16 proximate the collar 38, the buckling/bubbling, B, that may be potentially exhibited by the pre-filter 12, as shown in FIG. 4B, is obviated, and, the clean side surface 60 of the pre-filter 12 may be disposed substantially axially adjacent the dirty side flow face 22 of the filter body 14 without interruption. However, it will be appreciated that the nested connection of the pre-filter 12 at the radial recess 62 of the casing 16 may be enhanced, modified or supported by the application of the adhesive to one or more of the surfaces 56, 60 or 22, 28 as described above in a previous embodiment, and/or, an application of the adhesive to one or more of the surfaces 64-68 defined by the radial recess 62.

Figure 4D:
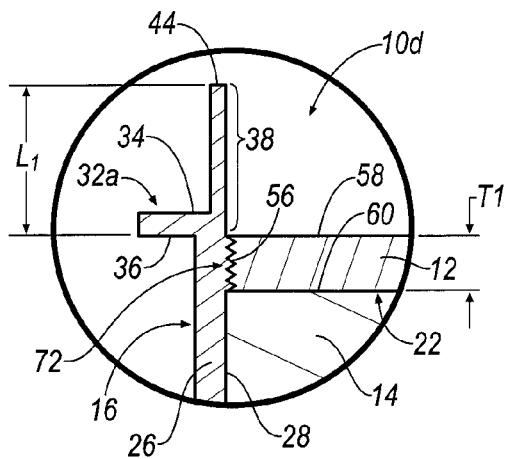

Referring now to FIG. 4D, another embodiment of a filter structure is shown generally at 10d in accordance with an embodiment of the invention. In an embodiment, the inner side surface 28 of the casing 12 includes a plurality of radially inwardly projecting barbs 72. In an embodiment, the plurality of radially-inwardly projecting barbs 72 extend radially inwardly along a portion of the inner side surface 28 of the casing 12 for a length approximately equal to a thickness, T1 (see also, e.g. FIG. 3), of the pre-filter 12.

Upon disposing the pre-filter 12 within the first sub-volume, $V_1$, the clean side surface 60 of the pre-filter 12 is disposed substantially adjacent the dirty side flow face 22 of the filter body 14, and, the outer side surface 56 is disposed substantially adjacent the plurality of radially-inwardly projecting barbs 72. Once the outer side surface 56 of the pre-filter 12 is disposed adjacent the plurality of inwardly-projecting barbs 72, the plurality of radially-inwardly projecting barbs 72 radially engage/radially "bite into" the outer side surface 56 of the pre-filter 12. As a result of the radial engagement/"biting into" of the outer side surface 56 of the pre-filter 12 by the plurality of radially-inwardly projecting barbs 72, axial movement of the pre-filter 12 relative the casing 16 is prevented, and, the pre-filter 12 may be structurally retained by the casing 16. However, it will be appreciated that the structural connection of the pre-filter 12 and the casing 16 described above may be enhanced, modified or supported by the application of the adhesive to one or more of the plurality of radially inwardly projecting barbs 72 and surfaces 56, 60 or 22, 28 as described above in a previous embodiment.

Figure 4E:
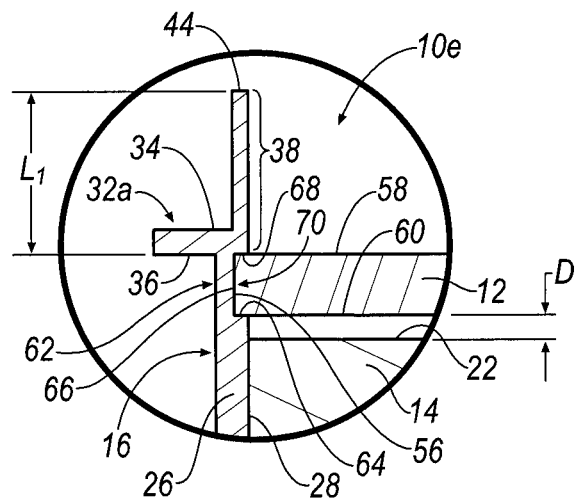

Referring now to FIG. 4E, another embodiment of a filter structure is shown generally at 10e in accordance with an embodiment of the invention. In an embodiment, the filter structure 10e is substantially similar to the filter structure 10c with the exception that the clean side surface 60 of the pre-filter 12 is spaced away from the dirty side flow face 22 of the filter body 14 at a distance, D. In an embodiment, as illustrated in FIG. 4E, the distance, D, may be achieved by reducing an overall thickness, T2 (see, e.g., FIG. 3), of the filter body 14 such that upon nesting the circumferential portion 70 into the radial recess 62 of the casing 16, the spacing as defined by the distance, D, is created.

Figure 4F:
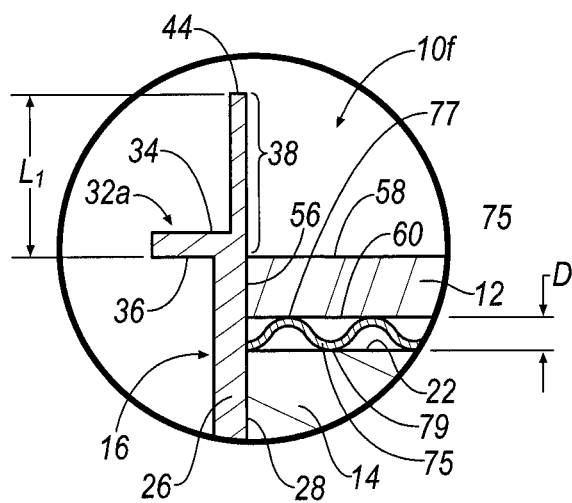

Referring now to FIG. 4F, another embodiment of a filter structure is shown generally at 10f in accordance with an embodiment of the invention. In an embodiment, the filter structure 10f is substantially similar to the filter structure 10a with the exception that the clean side surface 60 of the pre-filter 12 is spaced away from the dirty side flow face 22 of the filter body 14 at the distance, D. In an embodiment, as illustrated in FIG. 4F, the distance, D, may be achieved by disposing a porous spacing member 75 between the clean side surface 60 of the pre-filter 12 and the dirty side flow face 22 of the filter body 14. In addition to including the porous spacing portion 75 as a component of the filter structure 10f, it will be appreciated that the overall thickness, T2, of the filter body 14 may be reduced in order to accommodate the disposing of the porous spacing portion 75 within the first sub-volume, $V_1$.

In an embodiment, the porous spacing member 75 may include a wire mesh or the like. It will be appreciated, however, that the porous spacing member 75 is not limited to a wire mesh and may include, for example, a plastic mesh, non-woven fabric or the like.

In an embodiment, the porous spacing member 75 may include, for example, a substantially sinusoidal cross-section. In an embodiment, an upper surface/peak portion 77 of the porous spacing member 75 may be disposed substantially adjacent the clean side surface of the pre-filter 12, and, a lower surface/valley portion 79 may be disposed adjacent the dirty side flow face 22 of the filter body 14. It will be appreciated, however, that the porous spacing member 75 is not limited to include a substantially sinusoidal cross-section and that the porous spacing member 75 may include any desirable cross-section, such as, for example, a substantially uniform cross-section defining a substantially flat sheet having parallel upper and lower surfaces 77, 79.

Further, in an embodiment, in addition to spacing the pre-filter 12 from the filter body 14 at the distance, D, it will be appreciated that the porous spacing member 75 may provide an additional function as a filter element. Accordingly, in an embodiment, the pre-filter 12 may be referred to as a first stage pre-filter, and, the porous spacing member 75 may be referred to as a second stage pre-filter. Accordingly, in an embodiment, it will be appreciated that the porous spacing member 75 may include any desirable material, such as, for example, a foam material, a non-woven fabric, a wire mesh, or a plastic mesh that functions as a pre-filter in a substantially similar manner as that of the pre-filter 12.

Figure 4G:
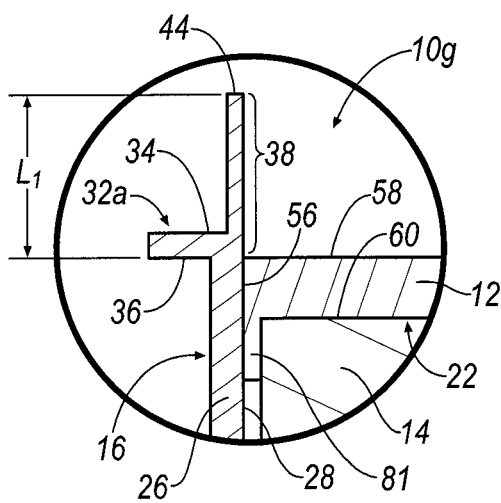

Referring now to FIG. 4G, another embodiment of the of a filter structure is shown generally at 10g in accordance with an embodiment of the invention. In an embodiment, pre-filter 12 includes a flange 81 that axially depends toward the filter body 14, when the pre-filter 12 is disposed upon the filter body 14 or installed within the casing 16. It should be noted that, based on this disclosure, it will become appreciated that the flange 81 may continuously extend around the pre-filter 12 or the flange 81 may be selectively positioned around the pre-filter. In an embodiment, the flange 81 is provided to positionally retain the pre-filter 12 within the casing 16 as it becomes snugly disposed between the filter body 14 and the inner surface 28 of the sidewall 26 of the casing 16. In an embodiment, the pre-filter is compressably retained thereby. In an embodiment, the pre-filter 12 is arranged proximate the filter 14 such that the flange 81 of the pre-filter is proximate a side of filter body 14 to form a sub-assembly; thereafter, this subassembly is inserted into casing 16 so that the subassembly frictionally engages the inner surface 28 of the sidewall 26 of the casing 16 whereby the flange 81 is intermediately disposed between inner surface 28 of the sidewall 26 of the casing and a side of the filter body 14. While the depiction of FIG. 4G illustrates that a space may be provided axially beneath a terminal end of flange 81 and between the inner surface 28 of the sidewall 26 of the casing 16 and the side of the filter element, it is to be appreciated (based on this disclosure) that the space may be de minimis or, depending on the width and compressibility of the pre-filter 12, eliminated. Thus, as the foregoing example identifies, the invention should not be limited to the depicted embodiments.

Referring now to FIGS. 1 and 3, in an embodiment, the pre-filer 12 and the filter body 14 define a filter sub-assembly 74 that is disposed within the first sub-volume, $V_1$, of the casing 12. In an embodiment, as seen in FIG. 3, the filter sub-assembly 74 may be defined to have a thickness, T. In an embodiment, the thickness, T, may be defined by the sum of the thickness, T1, of the pre-filter 12 and the thickness, T2, of the filter body 14. In an embodiment, the thickness, T, of the filter sub-assembly 74 is approximately equal to, but greater than the second sub-length, $L_2$, of the casing 16.

In an embodiment, referring to FIG. 2, the impurities that are contained in the dirty fluid, $F_D$, may include, for example, fine particulates, $P_1$, course particulates, $P_2$, and large particulates, $P_3$. In an embodiment, the fine particulates, $P_1$, may include, for example, microscopic dust particles, dirt particles, or the like. In an embodiment, the course particulates, $P_2$, may include, for example, relatively small stones, rocks or pebbles. In an embodiment, the large particulates, $P_3$, may include, for examples, leafs, plastic bags, or the like.

In an embodiment, the pre-filter 12 filters one or more of the course particulates, $P_2$, and the large particulates, $P_3$, from the fine particulates, $P_1$, by receiving and retaining one or more of the course particulates, $P_2$, and the large particulates, $P_3$, at the dirty side surface 58 of the pre-filter 12. Further, in an embodiment as described above, the pre-filter 12 is disposed and recessed into the first sub-volume, $V_1$, at a distance away from the dirty side axial end surface 44 approximately equal to the first sub-length, $L_1$, such that the second sub-volume, $V_2$, is not occupied by one or more of the pre-filter 12 and filter body 14.

In an embodiment, the second sub-volume, $V_2$, is defined by the inner surface 40 of the collar 38 and the dirty side surface 58 of the pre-filter 12. Functionally, the structure defining the second sub-volume, $V_2$ (i.e. the pre-filter 12 and the collar 38), may contain the course particulates, $P_2$, and the large particulates, $P_3$, that are removed from the dirty fluid, $F_D$, as the fine particulates, $P_1$, are permitted to pass through the pre-filter 12.

In an embodiment, it will be appreciated that the porosity of the pre-filter 12 is porous enough such that the fine particulates, $P_1$, are permitted to be filtered by and/or passed through the thickness, T1, of the pre-filter 12 such that the fine particulates, $P_1$, are permitted to enter into the filter body 14 at the dirty side flow face 22. It will be appreciated that when one or more of the course particulates, $P_2$, and the large particulates, $P_3$, are received and retained within the second sub-volume, $V_2$, the life and/or filtering capacity/capability of the media body 14 is increased.

In an embodiment, as seen at FIG. 5, the filter media body 14 is generally defined by a sheet 76 of fluted or corrugated filter media. As seen in FIG. 1, the sheet 76 is rolled upon itself to form the filter media body 14. In an embodiment, the sheet 76 is defined by a plurality of neighboring channels 78 each having an entrance opening 80 and an exit opening 82. In an embodiment, the plurality of entrance openings 80 generally define the dirty side flow face 22. In an embodiment, the plurality of exit openings 82 generally define the clean side flow face 24.

In an embodiment, the filter body 14 removes the fine particulates, $P_1$, from the dirty fluid, $F_D$, by permitting the dirty fluid, $F_D$, to axially enter the entrance opening 80, and then, after axially entering the entrance opening 80, the dirty fluid, $F_D$, is radially directed, R, from the channel 78, and through the sheet 76. Once moved through the sheet 76, the fine particulates, $P_1$, are removed from the dirty fluid, $F_D$, such that the dirty fluid, $F_D$, is thereafter referred to as clean fluid, $F_C$, that axially exits the filter body 14 at the exit opening 82.

Accordingly, by pre-filtering one or more of the course particulates, $P_2$, and the large particulates, $P_3$, with the pre-filter 12, entrance openings 80 of each of the channels 78 that define the dirty side flow face 22 are not congested. Accordingly, when one or more of the course particulates, $P_2$, and the large particulates, $P_3$, are received and retained at the dirty side surface 58 of the pre-filter 12, the dirty fluid, $F_D$, containing the fine particulates, $P_1$, is permitted to flow freely through the porous pre-filter 12 such that the filter body 14 may function appropriately by filtering the fine particulates, $P_1$, from the dirty fluid, $F_D$. Accordingly, with the inclusion of the pre-filter 12, the filter body 14 does not have to be serviced or replaced with a greater frequency by removing one or more of the course particulates, $P_2$, and the large particulates, $P_3$, from the dirty side flow face 22 of the filter body 14.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A replaceable filter element, comprising:
   a filter casing defining an inner radial surface;
   a filter body disposed within the casing, the filter body having an axial, dirty side surface and an axial, clean side surface, wherein the filter body includes fluted filter media having one or more flutes that extend from the dirty side surface to the clean side surface;
   a pre-filter including an axial, dirty side surface and an axial, clean side surface; and
   a layer of adhesive connecting a circumferential surface or the axial, clean side surface of the pre-filter to one or more of the axial, dirty side surface of the filter body and the inner radial surface of the filter casing, wherein the pre-filter is arranged within the casing so that the clean side surface of the pre-filter is proximate the dirty side surface of the filter body, wherein the filter body and the pre-filter are fixably retained by the inner radial surface of the casing.

2. The replaceable filter element as set forth in claim 1, wherein a portion of the pre-filter is frictionally retained between an inner surface of the filter casing and a side of the filter body.

3. The replaceable filter element as set forth in claim 1, wherein the pre-filter includes a porous foam material, a non-woven fabric, a wire mesh, or a plastic mesh.

4. The replaceable filter element as set forth in claim 1, wherein the clean side surface of the pre-filter is joined to the casing directly adjacent to the axial, dirty side surface of the filter body.

5. The replaceable filter element as set forth in claim 1, further comprising:
  a porous spacing member disposed between the dirty side surface of the pre-filter and the clean side surface of the filter body, the porous spacing member intermediately joining the pre-filter to the filter body.

6. A filter comprising:
  a casing including a sidewall having an inner radial surface;
  a filter body having an first axial surface, a second axial surface and an outer radial surface, wherein the outer radial surface is disposed adjacent the inner radial side surface of the casing, wherein the filter body includes fluted filter media having flutes extending axially between the first axial surface and the second axial surface of the filter body and wherein a first set of the flutes are closed proximate the first axial surface and a second set of the flutes are closed proximate the second axial surface such that fluid passing through the filter body passes through the filter media;
  a pre-filter having a first axial surface, a second axial surface and an outer radial surface that defines a perimeter around the pre-filter; and
  a layer of adhesive connecting the outer radial surface or the first axial surface of the pre-filter to one or more of the second axial surface of the filter body and the inner radial surface of the casing, wherein the outer radial surface of the pre-filter is disposed against the inner radial surface of the casing and snugly engaged therewith, and wherein the first axial surface of the pre-filter opposingly faces the second axial surface of the filter body.

7. The filter as set forth in claim 6, wherein the pre-filter is frictionally retained between a portion of the inner radial side surface of the casing and a portion of the outer radial surface of the filter body.

8. The filter as set forth in claim 6, wherein the first axial surface of the pre-filter is directly adjacent the second axial surface of the filter body with no intermediate elements therebetween.

9. The filter as set forth in claim 8, wherein at least a portion of the first axial surface of the pre-filter directly touches at least a portion of the second axial surface of the filter body.

10. The filter as set forth in claim 6, further comprising:
  a porous spacing member disposed between the first axial surface of the pre-filter and the second axial surface of the filter body, wherein the porous spacing member intermediately joins the pre-filter to the filter body.

11. The filter as set forth in claim 6, wherein the first axial surface of the pre-filter is spaced a pre-determined distance away from the second axial surface of the filter body.

12. A filter comprising:
  a casing including a sidewall having an inner side surface;
  a filter body including an outer side surface disposed adjacent the inner side surface of the casing;
  a pre-filter including an outer side surface disposed adjacent the inner side surface of the casing; and
  a layer of adhesive connecting the outer side surface of the pre-filter to the inner side surface of the casing for preventing axial movement of the pre-filter relative the casing.

* * * * *